United States Patent
Thanos et al.

(10) Patent No.: US 10,142,355 B2
(45) Date of Patent: Nov. 27, 2018

(54) PROTECTION OF TELECOMMUNICATIONS NETWORKS

(71) Applicant: TELUS Communications Inc., Burnaby (CA)

(72) Inventors: Daniel Thanos, Burlington (CA); Janahan Skandaraniyam, Markham (CA); Erez Maharshak, Vancouver (CA)

(73) Assignee: TELUS Communications Inc., Burnaby (CA)

( * ) Notice: Subject to any disclaimer, the term of this patent is extended or adjusted under 35 U.S.C. 154(b) by 0 days.

(21) Appl. No.: 14/859,067

(22) Filed: Sep. 18, 2015

(65) Prior Publication Data

US 2017/0085580 A1 Mar. 23, 2017

(51) Int. Cl.
| | | |
|---|---|---|
| G06F 21/55 | (2013.01) | |
| H04L 29/06 | (2006.01) | |
| H04L 12/26 | (2006.01) | |

(52) U.S. Cl.
CPC ...... H04L 63/1416 (2013.01); H04L 63/1441 (2013.01)

(58) Field of Classification Search
None
See application file for complete search history.

(56) References Cited

U.S. PATENT DOCUMENTS

| | | | | |
|---|---|---|---|---|
| 8,695,095 | B2* | 4/2014 | Baliga | G06F 21/568 709/224 |
| 9,083,737 | B2* | 7/2015 | Hermanns | H04L 63/08 |
| 2003/0172289 | A1* | 9/2003 | Soppera | H04L 63/0823 726/13 |
| 2008/0127335 | A1* | 5/2008 | Khan | H04L 63/00 726/22 |
| 2010/0122345 | A1* | 5/2010 | Wu | H04L 63/145 726/24 |
| 2010/0154059 | A1* | 6/2010 | McNamee | H04L 43/00 726/23 |
| 2010/0228852 | A1* | 9/2010 | Gemelos | G06Q 30/02 709/224 |
| 2011/0131650 | A1* | 6/2011 | de los Reyes | H04L 63/0209 726/22 |
| 2012/0227109 | A1* | 9/2012 | Dimuro | G06F 21/56 726/24 |
| 2014/0007235 | A1* | 1/2014 | Glenn | G06F 21/552 726/23 |
| 2014/0259168 | A1* | 9/2014 | McNamee | G06F 21/566 726/23 |
| 2015/0163236 | A1* | 6/2015 | Niemela | H04L 63/1425 726/23 |

(Continued)

OTHER PUBLICATIONS

Managed next generation firewall. Telus. 2011.*

(Continued)

Primary Examiner — Venkat Perungavoor
(74) Attorney, Agent, or Firm — Seed Intellectual Property Law Group LLP (57) ABSTRACT

A protection system for a telecommunications network includes an evaluation engine that receives information about threats from user devices using the network and determines a threat level to the network. Threats to the network are mitigated based on the determined threat level.

17 Claims, 6 Drawing Sheets

(56) References Cited

U.S. PATENT DOCUMENTS

2015/0215334 A1* 7/2015 Bingham ............ H04L 63/1425
726/23
2015/0319182 A1* 11/2015 Natarajan ............... G06F 21/53
726/24
2015/0341361 A1* 11/2015 Fransen .............. H04L 63/1416
455/410

OTHER PUBLICATIONS

Scalable Cloud Defenses for Detection, Analysis and Mitigation of DDoS Attacks. Latanicki et al. Towards the Future Internet. (Year: 2010).*

Network Security: Experiment of Network Health Analysis at an ISP. Houngbo. IJCSS. (Year: 2015).*

* cited by examiner

PROTECTION OF TELECOMMUNICATIONS NETWORKS

TECHNICAL FIELD

Telecommunications network security.

BACKGROUND

It is known to include security devices in a telecommunications network and security applications on user devices to detect threats. However, security devices and security applications as currently known can and will only detect threats on a per User Device basis or some other granular form. They don't have the capability or technology to determine whether such specific threats, especially the combined effect of such threats can endanger an entire telecommunications network.

SUMMARY

There is provided a protection system for a telecommunications network, the protection system including an evaluation engine having signals from detection devices as input, the evaluation engine being configured to perform analytics on information contained within the signals to determine whether a threat to the telecommunications network exists and to produce a trigger output when a threat to the telecommunications network has been determined, and protection devices, each protection device being configured to be responsive to the trigger output to take a step to lessen the threat to the telecommunications network.

In various embodiments, there may be included any one or more of the following features: The protection devices may comprise a notification device configured to provide notification messages to user devices. The notification messages may comprise instructions on how to remove a threat from a user device. The protection devices may comprise a mitigation device configured to alter service provided to a user device that uses the telecommunications network. The mitigation device may be configured to alter service for a user device by one or more of: disconnecting the user device from the telecommunications network, lowering quality of service for the user device, limiting access of the user device to the telecommunications network and selectively dropping traffic to or from the user device. The evaluation engine may be configured to instruct the mitigation device to restore service to the user device. The detection devices may comprise network devices and the signals may contain network based statistics. The evaluation engine may be configured to determine whether a threat to the telecommunications network exists by reference to technical specifications of the network devices. The evaluation engine may be configured to determine whether a threat to the telecommunications network exists by reference to configuration information of the network devices. The detection devices may comprise security devices and the signals contain information obtained from analysis of traffic on the telecommunications network. The security devices may comprise devices that tap into the telecommunications network. The security devices may comprise devices that are inline with traffic in the telecommunications network. The evaluation engine may be configured to distinguish between a potential threat and a current threat and to escalate a response to a threat when a potential threat is determined to have become a current threat.

There is provided a method of protecting a telecommunications network, the telecommunications network configured to relay packets between user devices and between user devices and other internet devices, some of the user devices having threats that cause the respective user devices to send or receive threat-related packets, the method comprising the steps of receiving information at an evaluation engine concerning threat-related packets detected at detection devices, inferring at the evaluation engine characteristics of the threats on the user devices from the threat-related packets, assessing at the evaluation engine an overall threat level posed to the network or a portion of the network by the inferred characteristics of the threats, and the evaluation engine providing, based on the overall threat level, a signal directing protection devices to take an action towards protection of the telecommunications network.

In various embodiments, there may be included any one or more of the following features: the detection devices may detect the threat-related packets using one or more of tapping of network traffic, inline inspection of traffic on the telecommunications network, or a security application on user devices; the characteristics of the threats may include the prevalence of threats among the user devices; the characteristics of the threats may include the distribution of threats among the user devices; the characteristics of the threats may include patterns of bandwidth usage of threats on the user devices; the characteristics of the threats may include the identification or classification of threats on the user devices; the evaluation engine may also assess whether any active threats exist on any user device of the user devices that affects the reliability or security of the telecommunications network either on its own or in combination with other active threats on user devices, and instruct the protection devices to take an action to mitigate the effect of the active threats that affect the reliability or security of the telecommunications network; the active threats may affect the reliability or security of the telecommunications network only in combination with other active threats, and the evaluation engine may assess that the active threats would not continue to affect the reliability or security of the telecommunications network if actions were taken to protect the network from a subset of the user devices with active threats, and protection devices may be instructed to protect the network from the subset of the user devices with active threats.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Described herein is a system for protecting a telecommunications network. The exemplary telecommunications network disclosed here is a network operated by one or more ISPs (Internet Service Providers), and is referred to as an ISP network. ISP Network may refer to any and all types, sizes, and tiers of networks from small access networks to large tier 1 carrier networks. The ISP network may be a wireless network, including all equipment and technology used by the ISP to service the wireless network. The system is primarily directed to protecting the wireless networks from threats originating from end user mobile devices or involving end user mobile devices.

Features and technology used for detection of threats:
1. Tapping of network traffic such as tapping of the links on the Evolved Packet Core (EPC) in an LTE (Long-Term Evolution) network. Tapping such traffic will allow for deep inspection of traffic to identify threats to the network.
2. Inline inspection of traffic on the wireless network.
3. Information gathered from an on-device security application.

Data accumulated through the above three methods and possibly others is forwarded to an aggregation entity that hosts an Evaluation Engine. The Evaluation Engine assesses the threat to the wireless network posed by the combined threat of all threats on all user end mobile devices.

A threat on a user device is software, embedded software, or hardware that is dysfunctional or malicious—for example malware—such that it causes the User Device to source traffic that threatens the reliability and security of the network it is connected to.

Based on the severity of the combined threat to the wireless network, actions will be taken to mitigate the threat. The following mitigation strategies will be used:
1. Notify the user of the threat posed by the device and methods the user can use to nullify the threat.
2. Limiting access of the user device to the ISP Network with no access to the internet.
3. Lowering the Quality of Service (QoS) allotment for the user such that the capability of the threat posed by the device is reduced.
4. Disconnect the device from the ISP Network.
5. Inline mitigation of specific traffic, for example, by blocking or black-holing specific traffic.

Figure 1:
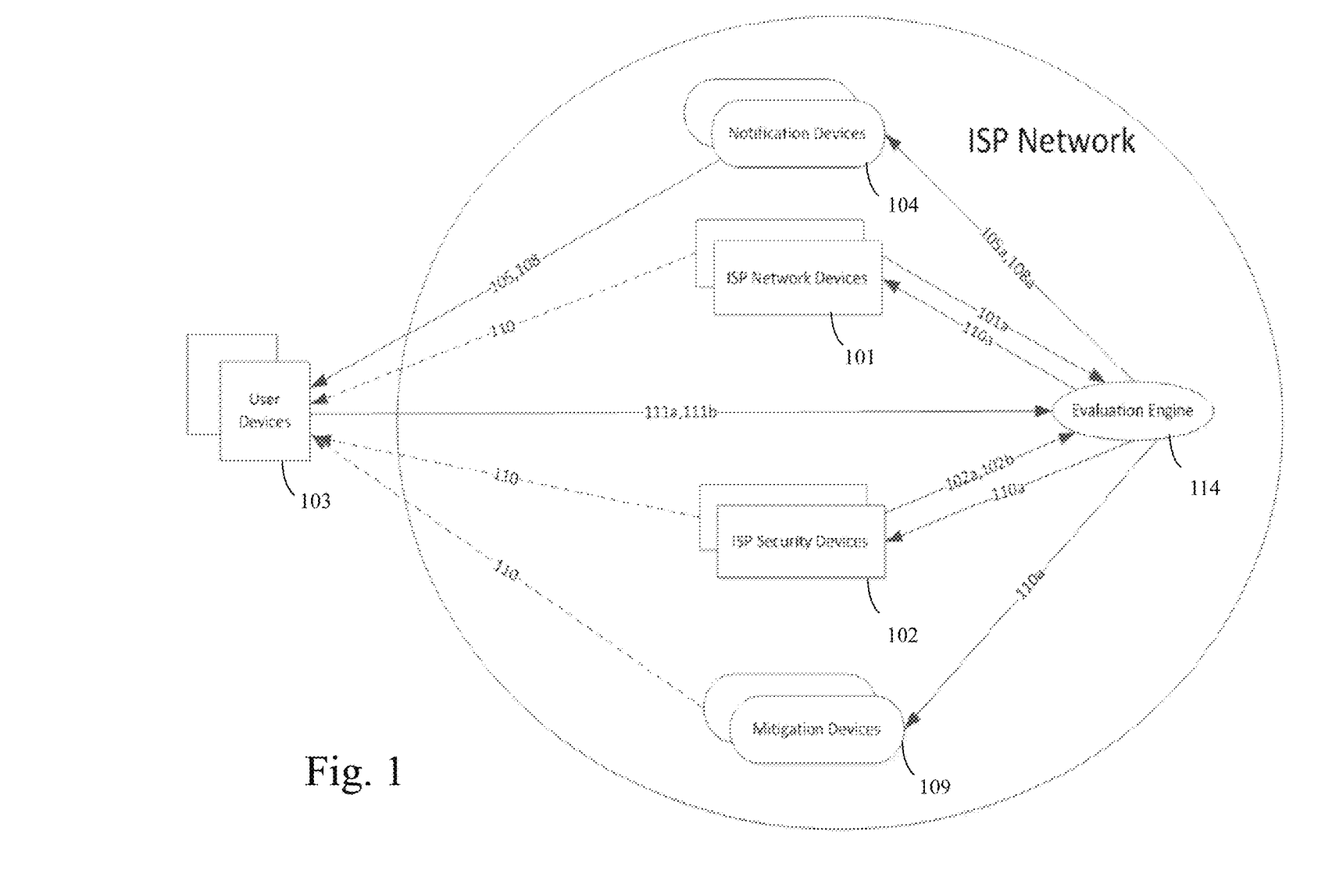
FIG. 1 is a schematic diagram of security-related communications between network components.

Below is a listing of terms, some of which are shown in FIG. 1:

ISP Network Device 101: A device that is part of, and in conjunction with other ISP Network devices makes up the network of the ISP which services end user customers with user devices. This would include routers, switches, firewalls, devices that make up an LTE network, etc. This device can be a "virtual device"—a piece of software that implements the device functionality on a virtual platform. An ISP Network Device can also be an inline Mitigation Device. The relevant technical specs and configuration information of ISP Network Devices, including limits and thresholds, will be made available to the Evaluation Engine with communication 101a. These may include but is not limited to:
1. Interface/Port Configuration
2. QoS Class Map
3. IP Configuration
4. Secure Login Configuration
5. Queuing Configuration
6. Current Operating Configuration
7. Standby Configuration
8. Start-up Configuration
9. Congestion thresholds
10. Slow-start threshold
11. Shutdown threshold
12. Environment thresholds ISP network devices may report network-based statistics that is visible to them to the Evaluation Engine with communication 101a. These may include but is not limited to:
1. Netflow based statistics/data
2. Traffic Statistics
3. Interface/Port status
4. Broadcast/Multicast
5. Errors/Discards
6. Time data was last received/transmitted
7. Traffic rates
8. Queue errors
9. Protocols statistics ISP Security Device 102:
This device inspects traffic and may perform one or more of the following:
1. Inspect/analyze the traffic, for e.g. by performing deep packet inspection, and detect threats residing on User devices. Such threats can e.g., be malware on the user device that when triggered could launch—in coordination with other malware infected user devices—a DDOS attack on the ISP network.
2. Report details of such threats to the Evaluation Engine via communication 102a.

This device can perform its inspection by tapping the communications links between ISP Network devices or by being in-line in the communications path between the ISP Network devices. This device can be a "virtual device," a piece of software that implements the device functionality on a virtual platform. The relevant technical specs and configuration information of such devices, including limits and thresholds, will be made available to the Evaluation Engine with communication 102b.

Examples of specific threats that may be detected by ISP security devices include:
1. Malware on User Devices such as Botnet malware.
2. DDOS attack in progress.
3. Signaling Storms and anomalies in progress.

User Devices 103: All end user devices that are provided service by the ISP through the ISP Network. This includes mobile devices, laptops, computers, etc.

Notification Device 104: A device used to send notifications to the User Devices such as Text Messages and Emails. This device can be a "virtual device"—a piece of software that implements the device functionality on a virtual platform.

Threat Notification 105: A notification such as a Text Message or an email that is sent to the User Device that provides or points to information such as the following:
1. The specifics related to the threat that exists on the User Device.
2. Instructions on how to remove the threat.

105a—Trigger for Notification Device to send Threat Notification.

Potential Threat (not shown): Can be one of the following:
1. A threat that exists on a User Device that is dormant but not active yet—the threat is not performing operations that can, either on its own or in combination with threats on other user devices, affect the reliability and security of the ISP Network, but has the capability to do so. An example is a Botnet malware that is waiting for a command from the Command-and-Control center to launch a DDOS attack on the ISP network.
2. A threat that exists on a User Device that is active but cannot by itself affect the reliability and security of the ISP network. Such a threat requires further threats on other User Devices to be active such that their combined operations would affect the reliability and security of the ISP network. An example is a malware that causes unwanted excessive usage of upstream bandwidth. While alone, this malware cannot affect the reliability and security of the ISP network, but in conjunction with similar and active malware on other User devices, the combined usage could result in a volumetric DDOS attack on the ISP network if the conditions of the activity of all the threats are of the correct mix.

Current Threat (not shown): Can be one of the following:
1. A threat that exists and is active on a User Device and can on its own affect the reliability and security of the ISP Network.
2. A threat that exists and is active on a User Device and cannot on its own affect the reliability and security of the ISP Network, but due to the existence of active threats on other User Devices, is part of the contribution to a combined effect which affects the reliability and security of the ISP Network.

Any Potential Threat can become a Current Threat if the conditions are right. The existence of a Current Threat implies that the reliability and security of the network are currently compromised.

Mitigation Notification 108: A notification such as a Text Message or an email that is sent to the User Device that consists of, or points to the following information:
1. Operations performed by the ISP on the service provided to the User device due to a potential threat or a current threat on the User Device.

108a—Trigger for Notification Device to send Mitigation Notification.

Mitigation Device 109: A device used to perform operations that control the service provided to a User device that uses the ISP Network. Examples of this device include PCRF (Policy and Charging Rules Function) and PCEF (Policy and Charging Enforcement Function) devices. This device can be a "virtual device"—a piece of software that implements the device functionality on a virtual platform. The operations performed can be one or a combination of:
1. Disconnecting the User Device from the ISP Network
2. Lowering the QOS for the User Device
3. Limiting the User Device to only access a single landing page hosted within the ISP Network—no internet access. This landing page may contain instructions on how to remove the threat and how the User can inform the ISP that the threat has been removed.
4. Granularly drop traffic to/from the User Device. For such an operation, a Mitigation Device may be an ISP Security device or an ISP Network device.

The same Mitigation Device is used to undo the above operations as well.

Forced Mitigation 110: Mitigation performed using the Mitigation Device. The mitigation operation performed may be reversed by the ISP once the User notifies the ISP that the threat has been removed.

110a—Trigger for Forced Mitigation.

Voluntary Mitigation (not shown): Mitigation performed by the User by removing the threat from the User Device—for example, by using the instructions in the Threat Notification.

Voluntary mitigation also involves the User notifying the ISP (and thus the Evaluation Engine defined below) that the User has removed the threat in communication 111a.

Security Application on User Device sends information on threats to Evaluation Engine in communication 111b.

Pre-attack Mitigation 112 (not shown in FIG. 1 but shown in FIG. 2, with details in FIG. 3): The act of mitigating Potential Threats.

Attack Mitigation 113 (not shown in FIG. 1 but shown in FIG. 2, with details in FIG. 4): The act of mitigating Current Threats.

Evaluation Engine 114: The central processing unit that performs all analytics and makes all decisions based on the results of that analysis. The Engine is fed or receives the following:
1. Network based statistics and reports from ISP Network Devices
2. Technical Specs and Configuration information of ISP Network Devices
3. Details of threats on User Devices from ISP Security Devices
4. Details of threats on User Devices from on-device Security application
5. Technical Specs and Configuration information of ISP Security Devices
6. Information regarding the removal of a threat from the User Device from the User.

The Evaluation engine maintains a database of usage abuse incidents (UAIs); preferably every threat on every user end device that is detected by ISP network devices or ISP security devices is reported to the evaluation engine and recorded as a usage abuse incident in the database. The Engine runs its algorithms on information in the UAI Database.

Based on an analysis of the above information, the Engine triggers the following:
1. Triggers the Notification Device to send Threat Notifications and/or Mitigation Notifications.
2. Triggers the Mitigation Device to perform or undo specific mitigation operations.

Figure 2:
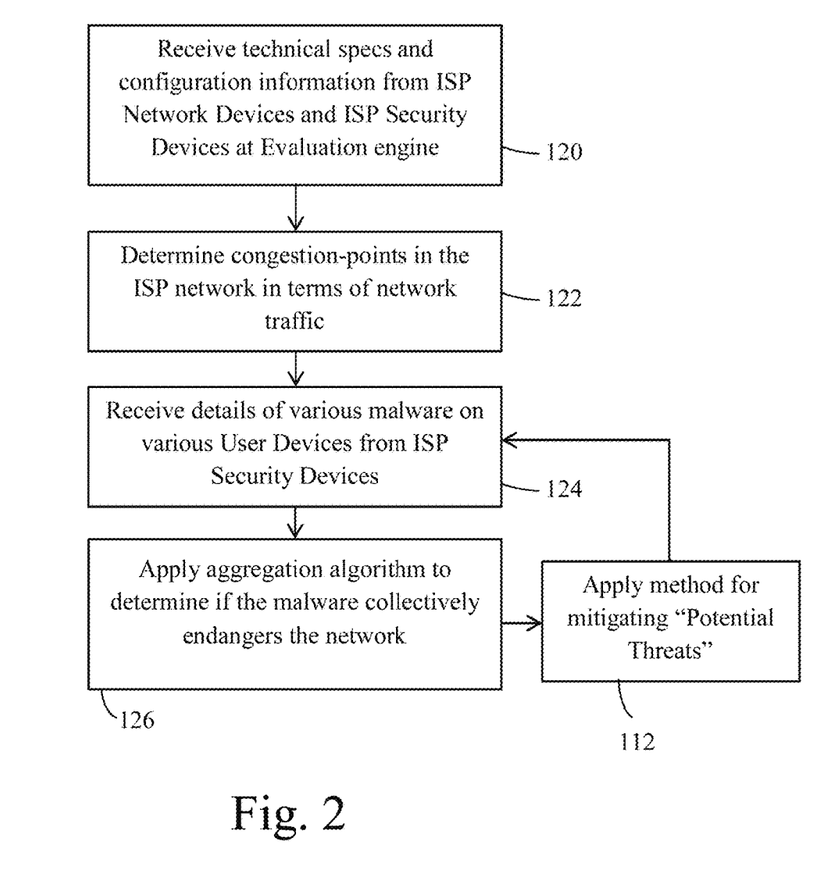
FIG. 2 is a flow chart showing an example decision procedure for the evaluation engine.

The Evaluation Engine may make decisions using any of various algorithms. An example using an aggregation algorithm is as follows, as shown in FIG. 2:
1. Evaluation Engine receives technical specs and configuration information from ISP Network Devices and ISP Security Devices in step 120. Using this information, the Engine can determine congestion-points in the ISP network in terms of network traffic in step 122.
2. ISP Security Devices sends Engine details of various malware on various User Devices in step 124. These details include Bandwidth usage by the malware when the malware is active.
3. The Engine determines through an aggregation algorithm whether if all the malware detected on all or any group of User Devices becomes active at the same time, there still will not be any effect on the reliability of the ISP Network in step 126. If there would still be no effect on the reliability of the network then the malware on all the User Devices are Potential Threats with no possibility of becoming Current Threats at this point and the method 112 of mitigating Potential Threats is followed.
4. If, on the other hand, enough malware is detected that the algorithm determines in step 126 that if all the malware on all or any group of User Devices becomes active at the same time, certain points in the network will be flooded and one or more ISP Network devices will start dropping traffic because thresholds will be surpassed, then this information may be relevant in carrying out the method of mitigating Potential Threats because there is now a possibility of Potential Threats becoming Current Threats. Regardless of the outcome of determination 126, the method 112 of mitigating Potential Threats is still followed because as long as an actual attack is not in progress, the malware on such a group of User Devices are still Potential Threats.

Note the above is just one example.

Another example of the operation of the Engine is as follows:

1. The Evaluation Engine receives technical specs and configuration information from ISP Network Devices and ISP Security Devices. Using this information, the Engine can determine congestion-points on the ISP network in terms of network traffic.
2. An OS (Operating System) version of a widely used mobile OS across a large number of User Devices is to be released and contains a bug/defect that causes signaling anomalies on the control plane traffic of the ISP network.
3. As users upgrade their devices to the new version of the OS, the cumulative effect of the bug/defect causes a signaling storm that grows in magnitude as more and more devices upgrade to the new version of the OS.
4. ISP Security Devices detect the signaling storm growing on the ISP network in near real-time and report information regarding it to the Evaluation Engine. The information includes which User Devices are causing the signaling storm.
5. The Engine determines through an algorithm if the signaling storm is reaching levels where it would soon cross certain thresholds and compromise the reliability of the ISP network. If it has reached such levels, the threats on the User Devices are Current Threats and the method of mitigating Current Threats is followed.
6. On the other hand, if it has not reached such levels, the threats on the User Devices are Potential Threats and the method of mitigating Potential Threats is followed.

Overview

An exemplary architecture is disclosed that implements a system and method to protect the reliability and security of an ISP network from user devices. By reliability is meant the ability of the ISP network to provide proper service—no service disruption caused by threats on User Devices. By security is meant the ability of the ISP network to not allow ISP related information to be leaked and thus compromised by threats on User Devices.

The approach taken by this system and method is to neutralize threats early in the game before they can, especially jointly, endanger the reliability and security of the network. The intention is to neutralize threats while they are Potential Threats and before they become Current Threats.

Figure 3:
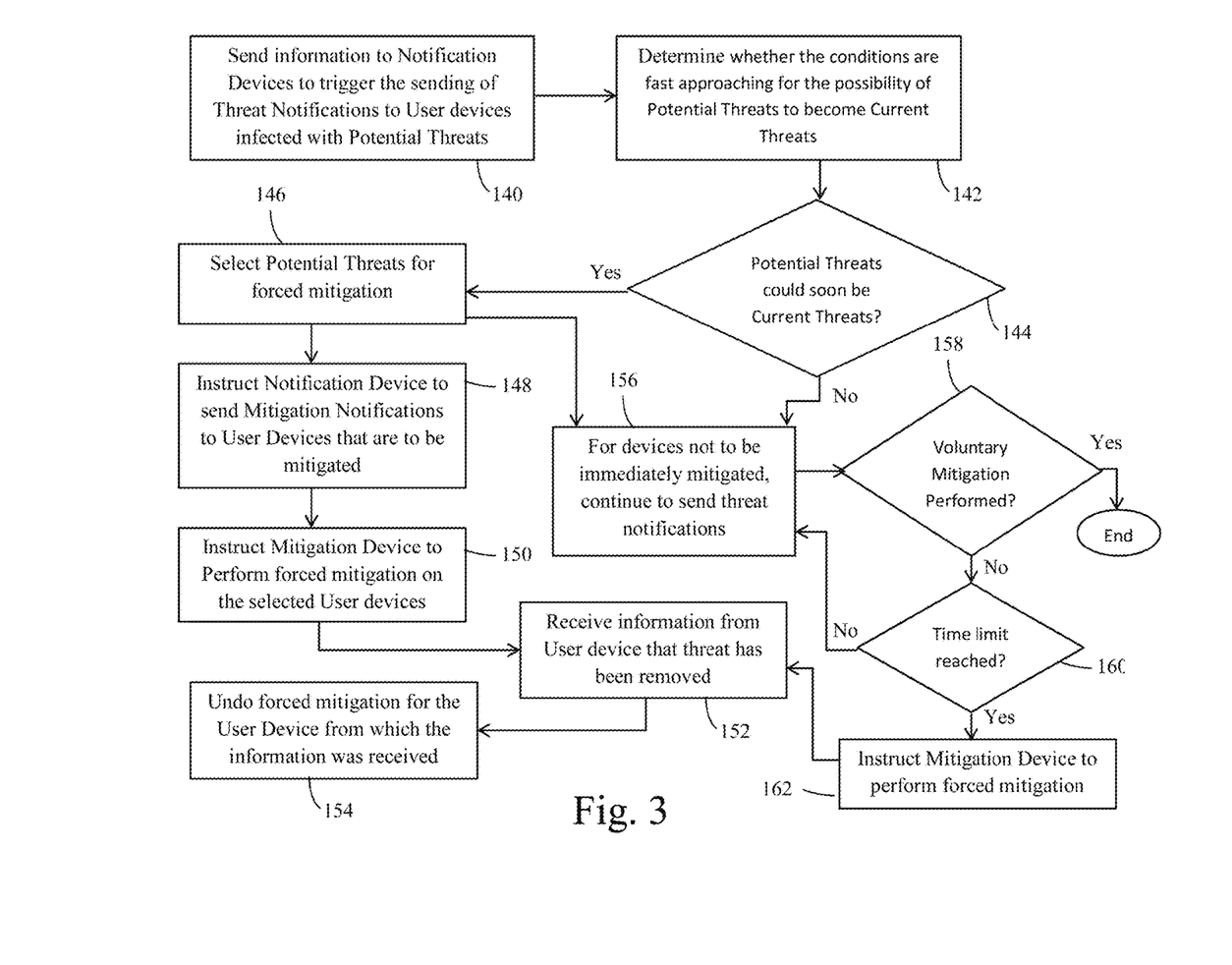
FIG. 3 is a flow chart showing a procedure for dealing with potential threats.

During normal operations of the ISP network, the Evaluation Engine gets information from the ISP Network devices and the ISP Security devices on a continuous basis while the ISP network is in use servicing the user devices. The Engine also has the technical specs and configuration information of the ISP Network devices and ISP Security devices. Based on all this information, and by performing analytics on this information, the Evaluation Engine performs the following:

For Pre-Attack Mitigation 112, as shown in FIG. 3:

1. In step 140, the Evaluation Engine sends information to the Notification device to trigger the sending of Threat Notifications to the User devices that are infected with Potential Threats.
2. In step 142, the Evaluation Engine determines whether the conditions are fast approaching for the possibility of Potential Threats to become Current Threats.
3. In decision step 144, if the determination in step 142 above is in the affirmative, the Engine will proceed to step 146 where a number of devices with Potential Threats are selected for forced mitigation such that the remaining devices with Potential Threats where no forced mitigation is performed has no possibility of becoming Current Threats. Prior to performing the forced mitigation, the Engine will send information in step 148 to the Notification device to trigger the sending of Mitigation Notifications to the User devices that are to be mitigated. In step 150, a mitigation device is instructed to perform the forced mitigation.
4. For devices that are mitigated, if the user sends information to the Engine via the ISP network that the threat has been removed, received by the Engine in step 152, the Engine will undo the forced mitigation operation applied to the User Device in step 154.
5. For devices that receive threat notifications but are not mitigated, the User can use Voluntary mitigation to remove the threat. If, as determined in decision step 158, the user does not use Voluntary mitigation and remove the threat, in step 156 repeated threat notifications will be sent periodically for a certain period of time until in decision step 160 it is determined that a time limit has been reached and forced mitigation is finally performed to force the user to remove the threat in step 162.

Figure 4:
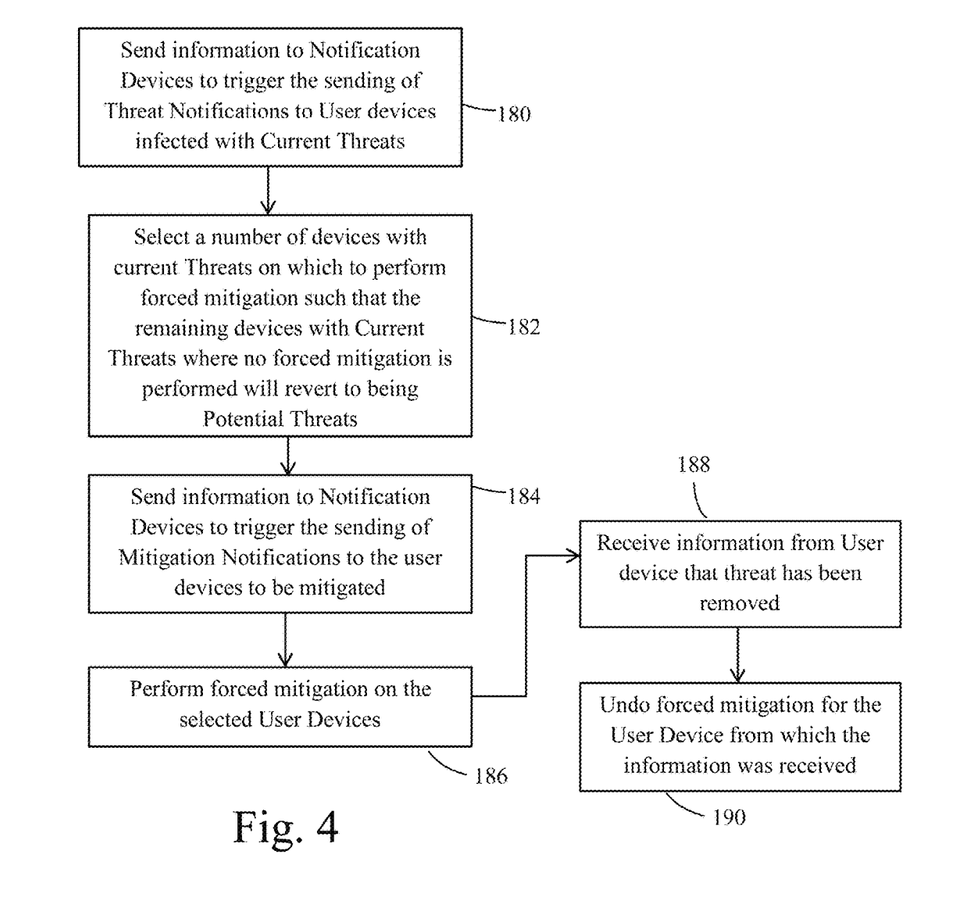
FIG. 4 is a flow chart showing a procedure for dealing with current threats.

For Attack Mitigation 113, as shown in FIG. 4:

The Engine has determined that a Current Threat exists—an attack is currently underway, in progress—that has compromised the reliability and/or security of the network. The Engine will:

1. In step 180, send information to the Notification device to trigger the sending of Threat Notifications to the User devices that are infected with the Current Threats if such notifications have not already been sent.
2. In step 182, the Engine will select a number of devices with Current Threats for forced mitigation such that the remaining devices with Current Threats where no forced mitigation is performed will revert back to being only Potential Threats. Prior to performing the forced mitigation, the Engine will send information to the Notification device in step 184 to trigger the sending of Mitigation Notifications to the User devices that are to be mitigated. In step 186, the Engine will send information to the mitigation device to perform forced mitigation on the selected devices.
3. For devices that are mitigated, if the user sends information to the Engine via the ISP network that the threat has been removed, received at the Engine in step 188, the Engine will undo the forced mitigation operation applied to the User Device in step 190.

Figure 5:
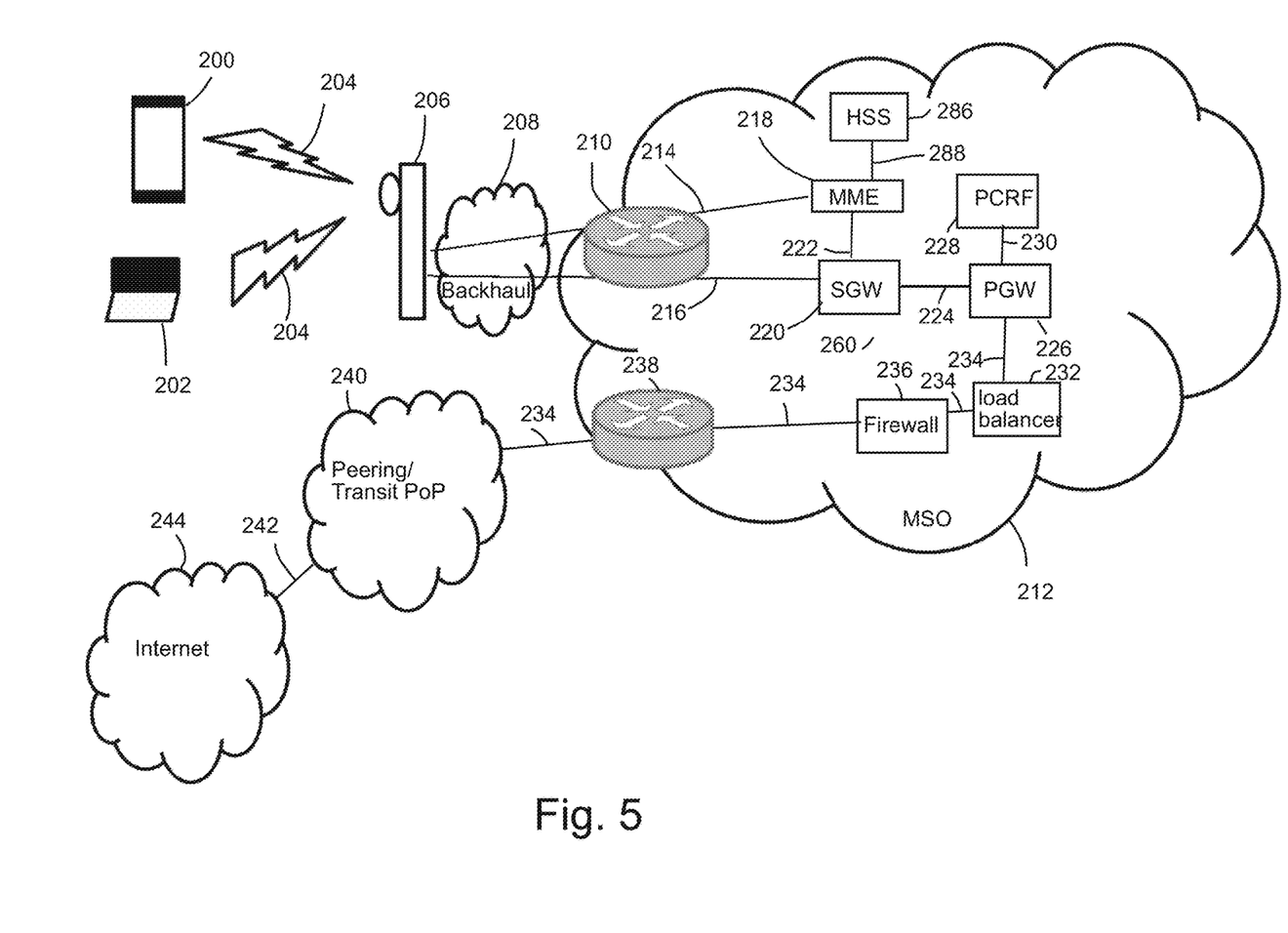
FIG. 5 shows an embodiment of a network before an embodiment of a protection system is installed.
Figure 6:
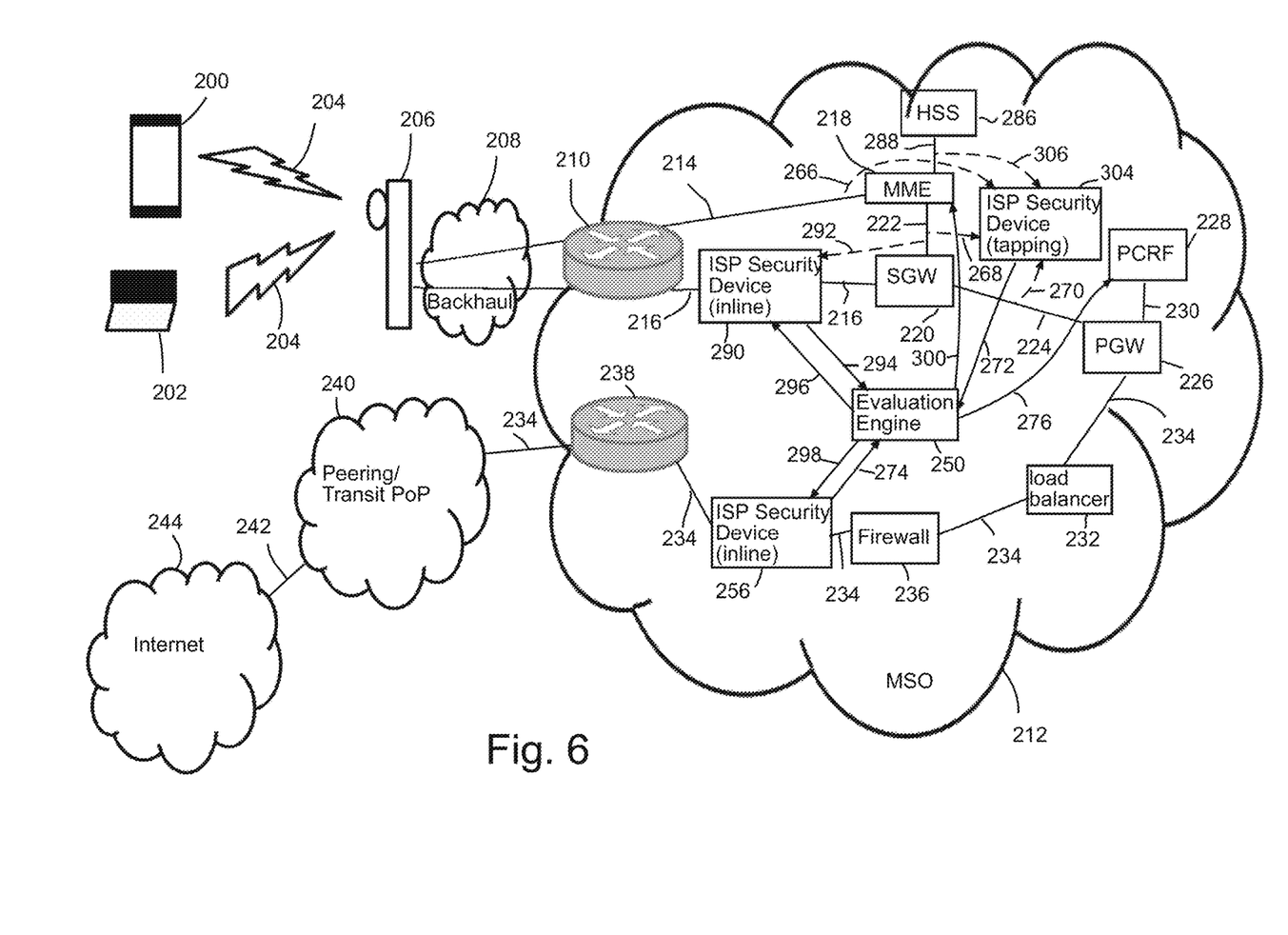
FIG. 6 shows an embodiment of a network after an embodiment of a protection system is installed.

FIGS. 5 and 6 show an embodiment of a network before (FIG. 5) and after (FIG. 6) an embodiment of a protection system is installed. In the example network shown in FIG. 5, user devices include mobile phone 200 and laptop 202 connected by wireless signals 204 to a cell tower 206. Signals are transmitted between router 210 and cell tower 206 via backhaul system 208. Router 210 is part of Mobile Switch Office network 212. Mobility Management Entity (MME) 218 communicates with the cell tower using S1-MME interface 214 and Serving Gateway (SGW) 220 communicates with the cell tower using S1-U interface 216. The MME and SGW communicate with each other using S11 interface 222. Home Subscriber Server (HSS) 286 communicates with MME 218 using S6a interface 288. Packet Data Network Gateway (PGW) 226 communicates with SGW 220 using S5 interface 224. Policy and Charging Rules Function (PCRF) 228 communicates with PGW 226 using Gx interface 230. Between PGW 226 and router 238 are load balancer 232 and Firewall 236. These elements communicate using SGi interface 234. Router 238 communicates with Peering/Transit Point of Presence (PoP) 240, also using SGi interface 234. Peering/Transit PoP communicates with the broader internet 244 via communication lines 242.

FIG. 6 includes all elements described above in relation to FIG. 5, and also additional elements. A first ISP Security Device (inline) 290 is inserted into and monitors S1-U interface 216. The first ISP Security Device (inline) 290 collects information and performs tasks relating to malware detection and mitigation and Volumetric DOS/DDOS detection and mitigation. In addition to the in-line monitoring, first ISP Security Device (inline) 290 taps S11 interface 222 in tapping information flow 292. First ISP Security Device (inline) 290 sends information to an Evaluation Engine 250 with information flow 294. A second ISP Security Device (inline) 256 is inserted between firewall 236 and router 238 and collects information from communications between these elements in SGi interface 234. Second ISP Security Device (inline) 256 is adapted to detect and mitigate volumetric DoS/DDoS attacks. Second ISP Security Device (inline) 256 sends information to Evaluation Engine 250 in information flow 274. An ISP Security Device (tapping) 304 is adapted to detect signaling storms and anomalies. ISP Security Device (tapping) 304 receives information from S1-MME interface 214 in tapping information flow 266, from communications in S11 interface 222 in tapping information flow 268, from S5 interface 224 in tapping information flow 270, and from S6a interface 288 in tapping information flow 306. ISP Security Device (tapping) 304 sends information to Evaluation Engine 250 in information flow 272. The Evaluation Engine 250 signals first ISP Security Device (inline) 290 to drop traffic to mitigate threats with signal flow 296. The Evaluation Engine 250 signals second ISP Security Device (inline) 256 to drop traffic to mitigate threats with signal flow 298. The Evaluation Engine also signals MME 218 to drop traffic to mitigate threats with signal flow 300. Evaluation Engine 250 signals PCRF 228 via information flow 276 to instruct PCRF 228 to take actions such as lowering QoS of a user, putting a user in a walled garden, or disconnecting a user, based on an assessment of threat to the network.

Immaterial modifications may be made to the embodiments described here without departing from what is covered by the claims.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A protection system for an internet service provider (ISP) network, wherein the ISP network is configured to relay packets between user devices connected to the ISP network and between the user devices and other internet devices, some of the user devices having threats that cause the respective user devices to send or receive threat-related packets, the protection system comprising:
an evaluation engine, the evaluation engine being configured to receive input signals including:
network-based statistics obtained from ISP network devices of the ISP network;
information obtained from analysis of traffic on the ISP network by ISP security devices of the ISP network; and
details of threats on the user devices from a security application on the user devices;
the evaluation engine being configured to perform analytics on information contained within the input signals by reference to technical specifications and configuration information of the ISP network devices and the ISP security devices to assess an overall threat level posed to the ISP network or a portion of the ISP network by the threats and determine whether an active threat that affects the reliability or security of the ISP network either on its own or in combination with other active threats on the user devices exists on any user device of the user devices and to produce a trigger output when such an active threat to the ISP network has been determined; and
protection devices of the ISP network, each protection device being configured to be responsive to the trigger output to take an action towards protection of the ISP network by mitigating the effect of the active threat that affects the reliability or security of the ISP network.

2. The protection system of claim 1 in which the protection devices comprise a notification device configured to provide notification messages to the user devices.

3. The protection system of claim 2 in which the notification messages comprise instructions on how to remove a threat from a user device of the user devices.

4. The protection system of claim 1 in which the protection devices comprise a mitigation device configured to alter service provided to a user device of the user devices.

5. The protection system of claim 4 in which the mitigation device is configured to alter service for a user device of the user devices by one or more of: disconnecting the user device from the ISP network, lowering quality of service for the user device, limiting access of the user device to the ISP network, and selectively dropping traffic to or from the user device.

6. The protection system of claim 5 in which the evaluation engine is configured to instruct the mitigation device to restore service to the user device.

7. The protection system of claim 1 in which the ISP security devices comprise devices that tap into the ISP network.

8. The protection system of claim 1 in which the ISP security devices comprise devices that are inline with traffic in the ISP network.

9. A method of protecting an internet service provider (ISP) network, wherein the ISP network is configured to relay packets between user devices connected to the ISP network and between the user devices and other internet devices, some of the user devices having threats that cause the respective user devices to send or receive threat-related packets, the method comprising the steps of:
receiving information at an evaluation engine concerning threat-related packets detected at detection devices, the information including:
network based statistics obtained from ISP network devices of the ISP network;
information obtained from analysis of traffic on the ISP network by ISP security devices of the ISP network; and
details of threats on the user devices from a security application on the user devices;

inferring, at the evaluation engine, characteristics of the threats on the user devices from the threat-related packets;

assessing, at the evaluation engine, an overall threat level posed to the ISP network or a portion of the ISP network by the inferred characteristics of the threats by reference to technical specifications and configuration information of the ISP network devices and the ISP security devices, and assessing whether an active threat exists on any user device of the user devices that affects the reliability or security of the ISP network either on its own or in combination with other active threats on user devices; and the evaluation engine providing, based on the overall threat level, a signal directing protection devices of the ISP network to take an action towards protection of the ISP network by mitigating the effect of the active threat that affects the reliability or security of the ISP network.

10. The method of claim 9 in which the ISP security devices detect the threat-related packets using one or more of tapping of network traffic or inline inspection/sniffing of traffic on the ISP network.

11. The method of claim 9 in which the characteristics of the threats include the prevalence of threats among the user devices.

12. The method of claim 9 in which the characteristics of the threats include the distribution of threats among the user devices.

13. The method of claim 9 in which the characteristics of the threats include patterns of bandwidth usage of threats on the user devices.

14. The method of claim 9 in which the characteristics of the threats include the identification or classification of threats on the user devices.

15. The method of claim 9 in which the active threats affect the reliability or security of the ISP network only in combination with other active threats, and the evaluation engine assesses that the active threats would not continue to affect the reliability or security of the ISP network if actions were taken to protect the ISP network from a subset of the user devices with active threats, and the protection devices are instructed to protect the ISP network from the subset of the user devices with active threats.

16. The protection system of claim 1 in which the evaluation engine is configured to receive the technical specifications and configuration information of the ISP network devices and the ISP security devices from the ISP network devices and the ISP security devices.

17. The method of claim 9 further comprising the step of receiving at the evaluation engine, from the ISP network devices and the ISP network devices, the technical specifications and configuration information of the ISP network devices and the ISP security devices.

* * * * *